(12) United States Patent
Chang et al.

(10) Patent No.: US 11,955,841 B2
(45) Date of Patent: Apr. 9, 2024

(54) STATOR AND MOTOR ASSEMBLY INCLUDING SAME

(71) Applicant: DAEGU GYEONGBUK INSTITUTE OF SCIENCE AND TECHNOLOGY, Daegu (KR)

(72) Inventors: Sung Woo Chang, Hwaseong-si (KR); Seung Yeol Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 463 days.

(21) Appl. No.: 17/275,782

(22) PCT Filed: Sep. 18, 2019

(86) PCT No.: PCT/KR2019/012073
§ 371 (c)(1),
(2) Date: Mar. 12, 2021

(87) PCT Pub. No.: WO2020/060190
PCT Pub. Date: Mar. 26, 2020

(65) Prior Publication Data
US 2022/0052566 A1 Feb. 17, 2022

(30) Foreign Application Priority Data
Sep. 18, 2018 (KR) .................. 10-2018-0111603

(51) Int. Cl.
*H02K 1/14* (2006.01)
*H02K 1/278* (2022.01)
*H02K 21/16* (2006.01)

(52) U.S. Cl.
CPC ............. *H02K 1/146* (2013.01); *H02K 1/278* (2013.01); *H02K 21/16* (2013.01)

(58) Field of Classification Search
CPC .......... B60T 11/26; B60T 11/34; B60T 13/12; B60T 13/14; B60T 17/18; B60T 17/221;
(Continued)

(56) References Cited

U.S. PATENT DOCUMENTS 2,802,123 A * 8/1957 Tweedy .................. H02K 17/08
310/198
3,154,708 A * 10/1964 Shaffer .................. H02K 17/04
310/216.071
(Continued)

FOREIGN PATENT DOCUMENTS

JP 2004-129324 4/2004
JP 2005261182 9/2005
(Continued)

OTHER PUBLICATIONS

WO-2016047476-A1, Aoki, all pages (Year: 2016).*
(Continued)

*Primary Examiner* — Naishadh N Desai
(74) *Attorney, Agent, or Firm* — LEX IP MEISTER, PLLC (57) ABSTRACT

The present invention provides a stator and a motor assembly including the same. The stator includes: a stator core disposed outside a rotor core and having an inner surface inclined with respect to a rotation axis of a rotor; a plurality of coil-wound teeth extending from the inner surface of the stator core towards the rotation axis, wherein a coil is wound around each of the plurality of coil-wound teeth; and openings formed by sidewalls of the plurality of coil-wound teeth and the inner surface of the stator core, wherein a cross-sectional area of the openings changes along a direction of the rotation axis.

10 Claims, 8 Drawing Sheets

(58) Field of Classification Search
CPC .......... B60T 8/344; B60T 8/4233; B60T 8/88; H02K 1/146; H02K 1/278; H02K 21/16; H02K 2213/03; H02K 1/14
See application file for complete search history.

(56) References Cited

U.S. PATENT DOCUMENTS

| | | | | |
|---|---|---|---|---|
| 4,038,575 | A * | 7/1977 | Nordebo | H02K 19/24 310/179 |
| 4,982,129 | A * | 1/1991 | Eggert | H02K 3/28 310/216.106 |
| 5,751,089 | A * | 5/1998 | Stridsberg | H02K 21/125 310/266 |
| 6,744,157 | B2 * | 6/2004 | Choi | H02K 1/165 310/58 |
| 2002/0093254 | A1 * | 7/2002 | Asao | H02K 3/24 310/58 |
| 2003/0030346 | A1 * | 2/2003 | Schustek | H02K 1/265 310/216.069 |
| 2004/0245881 | A1 * | 12/2004 | Kadoya | H02K 1/146 310/156.53 |
| 2009/0174280 | A1 * | 7/2009 | Prudham | H02K 1/14 310/216.022 |
| 2010/0084942 | A1 * | 4/2010 | Taniyama | H02K 1/265 310/216.072 |

FOREIGN PATENT DOCUMENTS

| | | | | |
|---|---|---|---|---|
| JP | 2009118610 | | 5/2009 | |
| JP | 2017-169248 | | 9/2017 | |
| KR | 10-2014-0018680 | | 2/2014 | |
| KR | 10-1533228 | | 7/2015 | |
| KR | 10-2017-0052963 | | 5/2017 | |
| WO | WO-2015087381 | A1 * | 6/2015 | ............ B66B 11/043 |
| WO | WO-2016047476 | A1 * | 3/2016 | ............ H02K 1/146 |
| WO | 2017/085953 | | 5/2017 | |
| WO | 2017/196269 | | 11/2017 | |

OTHER PUBLICATIONS

WO-2015087381-A1, Komatsu, all pages (Year: 2015).*
Jiabao Wang et al., "Magnetic Field and Operating Performance Analysisof Conical-rotor Permanent Magnet Synchronous Motor", CES Transactions on Electrical Machines and Systems, vol. 2, No. 1, Mar. 2018.

* cited by examiner

STATOR AND MOTOR ASSEMBLY INCLUDING SAME

TECHNICAL FIELD

The present invention relates to a stator and a motor assembly including the same.

BACKGROUND ART

A motor is a machine that obtains rotational force from electric energy, and includes a stator and a rotor. The rotor is configured to interact electromagnetically with the stator, and is rotated by a force acting between a magnetic field and a current flowing through a coil.

Permanent magnet motors, which use permanent magnets in order to generate a magnetic field, can be categorized into a surface-mounted permanent magnet motor, an interior-type permanent magnet motor, and a spoke-type permanent magnet motor.

Recently, a permanent magnet (PM) vernier motor has been actively studied as a direct drive motor which does not use a gear reducer, to be applied to robots and electric cars. The permanent magnets required by such a PM vernier motor can improve the performance of the motor. However, considering that the permanent magnets require specific metals such as rare-earth elements, it can be said that the permanent magnet motors have some deficiencies in terms of fossil fuel depletion and environmental pollution.

Therefore, there is a need for research into PM motors capable of minimizing the use of permanent magnets and maximizing torque of the motors. One example of such a PM motor is a double half-type PM vernier motor, in which the total number of permanent magnets can be reduced as the permanent magnets are disposed to be spaced apart from each other on the surface of a rotor and disposed in the teeth of a stator. However, such a double half-type PM vernier motor has a deficiency in that the permanent magnets lower the efficiency of electromagnets, because the polarities formed by the electromagnets of the stator alternate, whereas the polarities of the permanent magnets are constant.

Another example of a PM motor is a rotor half-type PM vernier motor, which is produced by removing permanent magnets having any one polarity in the rotor of a conventional PM vernier motor and making the permanent magnet-removed portion have a polarity. When, salient poles are formed to substitute the removed permanent magnets, the salient poles are magnetized by the permanent magnets having the opposite polarity to the removed polarity, and as a result, the salient poles come to have a polarity that is opposite to the polarity of adjacent permanent magnets. As a result, the rotor half-type PM vernier motor comes to have the same structure as that of a conventional PM vernier motor and to have a similar performance to that of the conventional PM vernier motor. Accordingly, the number of the permanent magnets required can be reduced by half.

In addition, when permanent magnets are installed between the teeth of the stator in the rotor half-type PM vernier motor, the performance of the motor can be further improved while the number of the permanent magnets used is similar to that of the conventional PM vernier motor. That is, in the double half-type PM vernier motor, as some of the permanent magnets are disposed on the surface of the rotor to be spaced apart from each other, the number of the permanent magnets required is reduced by half, and as the remaining half of the permanent magnets are disposed in the teeth of the stator, the performance of the motor can be improved.

Such a double half-type PM vernier motor has improved performance compared to the conventional PM vernier motor, but the efficiency thereof is not remarkably higher than the conventional PM vernier motor. In detail, the polarities formed by the electromagnets mounted in the stator of the double half-type PM vernier motor alternate by an alternating current power source, whereas the polarity of the permanent magnets is constant. As a result, a magnetic flux short circuit occurs between the permanent magnets and the electromagnets, which lowers the efficiency of the motor.

DISCLOSURE OF INVENTION

Technical Problem

An aspect of the present invention is directed to providing a stator for generating a relatively high torque and a motor assembly including the same. In addition, space utilization of the motor assembly may be improved by minimizing the volume of the motor assembly. However, said problem is merely an example, and the scope of the present invention is not limited thereto.

Solution to Problem

According to an aspect of the present invention, a stator may include: a stator core disposed outside a rotor core and having an inner surface which is inclined with respect to a rotation axis of the rotor; a plurality of coil-wound teeth extending from the inner surface of the stator core towards the rotation axis, wherein a coil is wound around each of the plurality of coil-wound teeth; and openings formed by sidewalls of the plurality of coil-wound teeth and the inner surface of the stator core, wherein a cross-sectional area of the openings may change along a direction of the rotation axis.

Advantageous Effects of Invention

The stator and the motor assembly including the same according to the present invention are characterized in that as the cross-sectional area of the openings formed in the stator changes along a direction of the rotation axis, current density improves and energy efficiency may be increased. In addition, the stator and the motor assembly including the same according to the present invention are characterized by comprising salient teeth, which form a passage through which a generated magnetic flux can sufficiently flow. Accordingly, a relatively high torque may be generated.

In particular, the stator and the motor assembly including the same according to the present invention are characterized in that as the inner surface of the stator core is formed to be inclined at an angle greater than 0 degrees and smaller than 20 degrees with respect to the rotation axis, a magnetic flux may be sufficiently generated, and energy density and current density may be maximized However, the scope of the present invention is not limited by said effects.

BRIEF DESCRIPTION OF DRAWINGS

FIG. 2b is an expanded view of region A marked in FIG. 2a.

FIG. 3b is an expanded view of region B marked in FIG. 3a.

FIG. 5a is a view illustrating the flow of magnetic flux in the motor assembly of FIG. 1, and FIGS. 5b and 5c are views illustrating, as comparative examples, the flow of magnetic flux in conventional PM motors.

BEST MODE FOR CARRYING OUT THE INVENTION

According to an aspect of the present invention, a stator may include: a stator core disposed outside a rotor core and having an inner surface which is inclined with respect to a rotation axis of the rotor; a plurality of coil-wound teeth extending from the inner surface of the stator core towards the rotation axis, wherein a coil is wound around each of the plurality of coil-wound teeth; and openings formed by sidewalls of the plurality of coil-wound teeth and the inner surface of the stator core, wherein a cross-sectional area of the openings may change along a direction of the rotation axis.

A thickness of the stator core in a radial direction may linearly increase along one direction of the rotation axis.

A surface area of the openings measured on one surface of the stator and a surface area of the openings measured on the other surface of the stator may be different from each other.

The stator may further include a plurality of salient teeth around which the coil is not wound, wherein the plurality of salient teeth may extend from the inner surface of the stator core towards the rotation axis across the openings.

A length of the salient teeth in the radial direction may be the same as a length of the coil-wound teeth in the radial direction.

A thickness of the salient teeth in a circumferential direction may be the same as a thickness of the coil-wound teeth in the circumferential direction.

An end portion of the salient teeth and an end portion of the coil-wound teeth may be spaced apart from each other by a predetermined distance along the circumferential direction.

The inner surface of the stator core may be inclined with respect to the rotation axis at an angle greater than 0 degrees and smaller than 20 degrees.

According to another aspect of the present invention, a motor assembly includes: a rotor core configured to rotate about a rotation axis; a plurality of permanent magnets disposed on a surface of the rotor core or at least partially embedded in the rotor core; a stator core disposed outside the rotor core and having an inner surface inclined with respect to the rotation axis; a plurality of coil-wound teeth extending from the inner surface of the stator core towards the rotation axis; a coil wound around the coil-wound teeth; and openings formed by sidewalls of the plurality of coil-wound teeth and the inner surface of the stator core, wherein a cross-sectional area of the openings may change along a direction of the rotation axis.

The inner surface of the stator core may be inclined at an angle greater than 0 degrees and smaller than 20 degrees with respect to the rotation axis.

The stator may further include a plurality of salient teeth around which the coil is not wound, wherein the plurality of salient teeth may extend from the inner surface of the stator core towards the rotation axis across the openings.

Other aspects, characteristics, and advantages of the present invention not mentioned above will be clarified from the following detailed description, claims, and drawings of the present application.

DESCRIPTION OF EMBODIMENTS

Hereinafter, various exemplary embodiments of the present disclosure will be described referring to the accompanied drawings. The various exemplary embodiments may be modified in various ways, and only a few specific exemplary embodiments among them are illustrated in the drawings and described in the detail description. However, this is not intended to limit the embodiments of the present disclosure to the specific embodiments, and the specific embodiments should be understood as including all modifications, equivalents, and/or replacements that fall within the spirit and technical scope of various embodiments of the present disclosure. Similar reference numerals or symbols are used in different drawings to indicate similar components.

As used herein, the terms "comprise," "comprising," "including," "having," and the like are used to indicate the presence of disclosed features, operations, or elements, and do not preclude presence of one or more other additional features, operations, or elements. In addition, it should be understood that the terms "comprise," "comprising," "including," "having," and the like are used only to indicate the presence of described features, numbers, steps, operations, elements, components or a combination thereof, and do not preclude a possibility of presence or addition of one or more other features, numbers, steps, operations, elements, components or a combination thereof.

The term "or" as used herein is to be interpreted as including any and all combinations of words listed together. For example, "A or B" means either one of A or B, or both of A and B.

Although the terms "first," "second," "third," etc. may be used herein to describe various elements, components, regions, layers and/or sections, these elements, components, regions, layers and/or sections should not be limited by these terms. For example, said terms do not limit a sequence or order unless clearly indicated by the context. Said terms can be used to distinguish one component from another component. For example, both of "a first user device" and "a second user device" are user devices, and refer to two different user devices. For example, without departing from the scope of the rights of various embodiments of the present disclosure, a first component may be referred to as a second component, and similarly, a second component may be referred to as a first component.

When an element or layer is referred to as being "on," "engaged to," "connected to," or "coupled to" another element or layer, it means that the element or layer is directly on or engaged, connected or coupled to the another element or layer, but it should be understood that another element or layer may be present therebetween. In contrast, when an element is referred to as being "directly on," "directly engaged to," "directly connected to," or "directly coupled to" another element or layer, it should be understood that there is no element therebetween.

The terms used in this application are for the purpose of describing specific exemplary embodiments only, and are not intended to limit the various embodiments of the present disclosure. As used herein, the articles "a," "an," and "the" include plural referents unless the context clearly dictates otherwise.

Furthermore, unless specifically defined otherwise, all the terms used in the detailed description, including technical and scientific terms, have the same meaning as would be commonly understood by a person skilled in the art in the technical field of the present disclosure.

It shall be understood that the terms defined in generally used dictionaries should be interpreted as having meanings corresponding to the context in the relevant art, and unless expressly so defined herein, the terms should not be interpreted in an idealized or overly formal sense.

Figure 1:
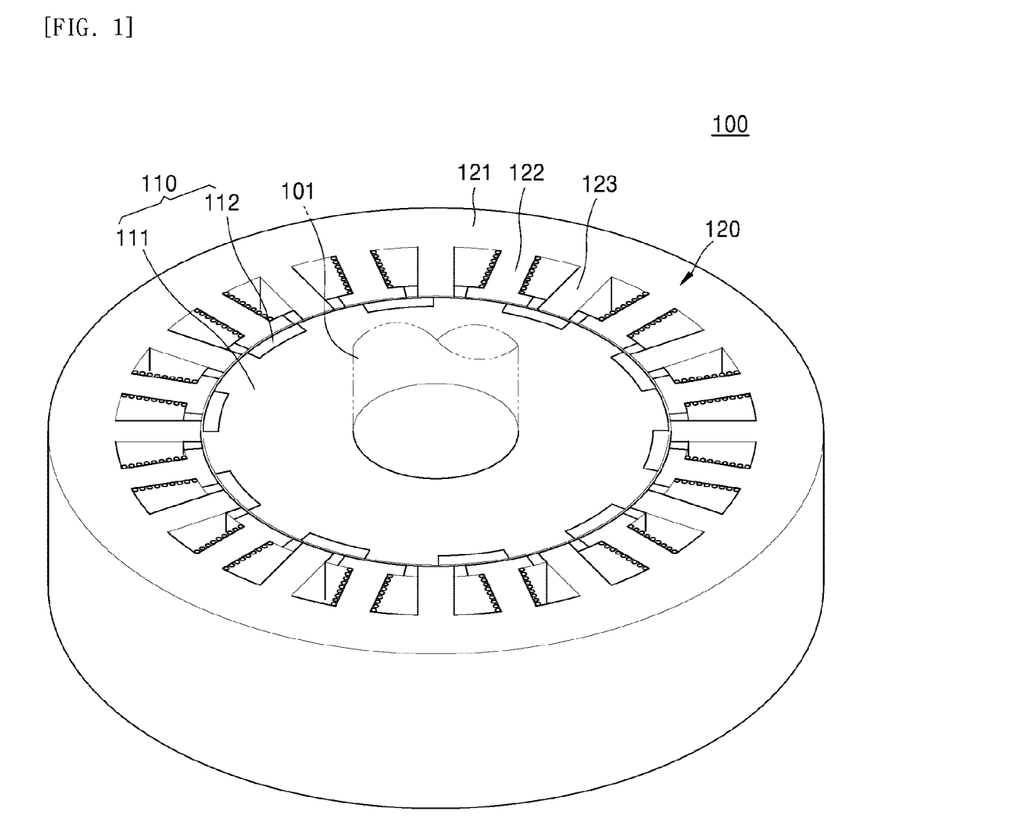
FIG. 1 is a perspective view of a motor assembly according to one embodiment of the present invention.
Figure 2A:
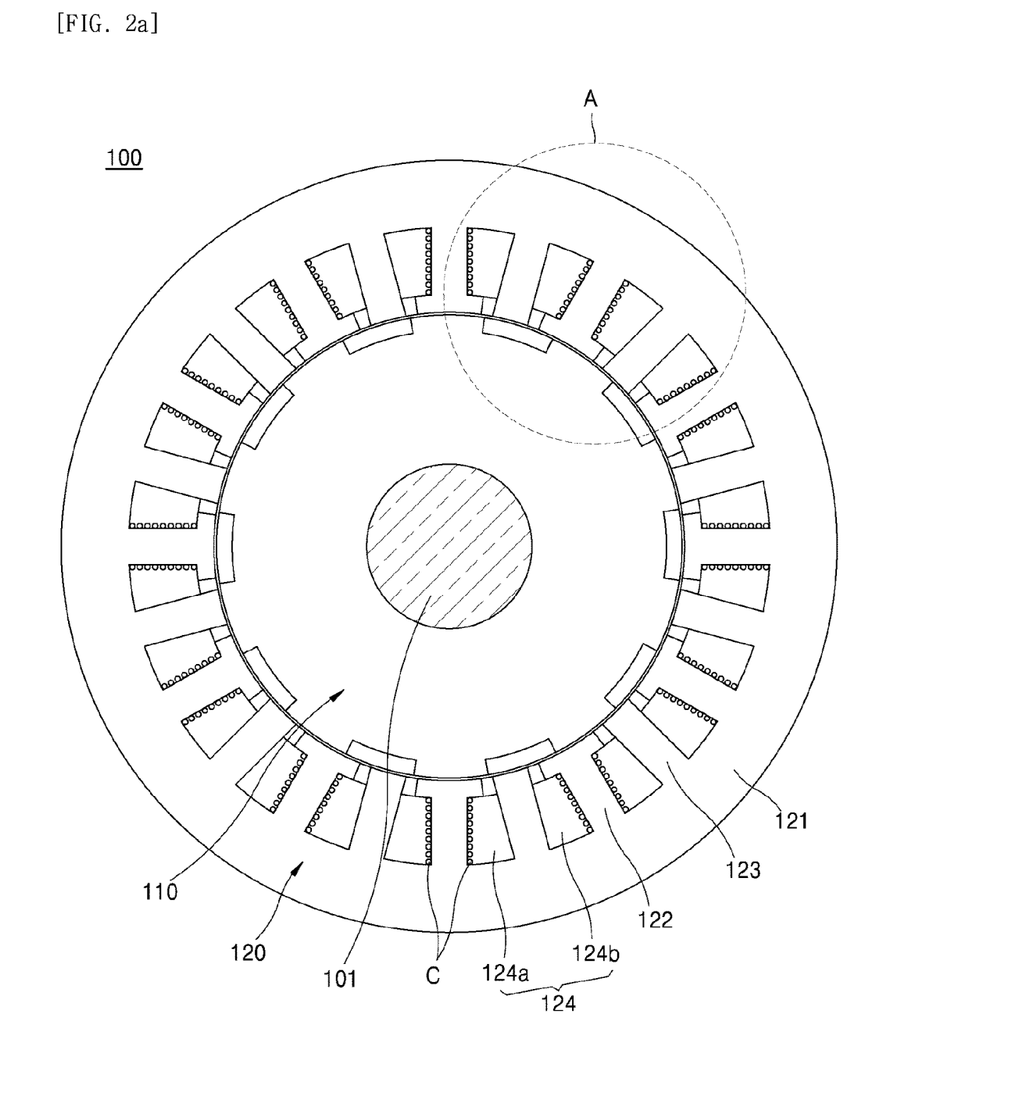
FIG. 2a is a plane view illustrating one surface of the motor assembly of FIG. 1.
Figure 2B:
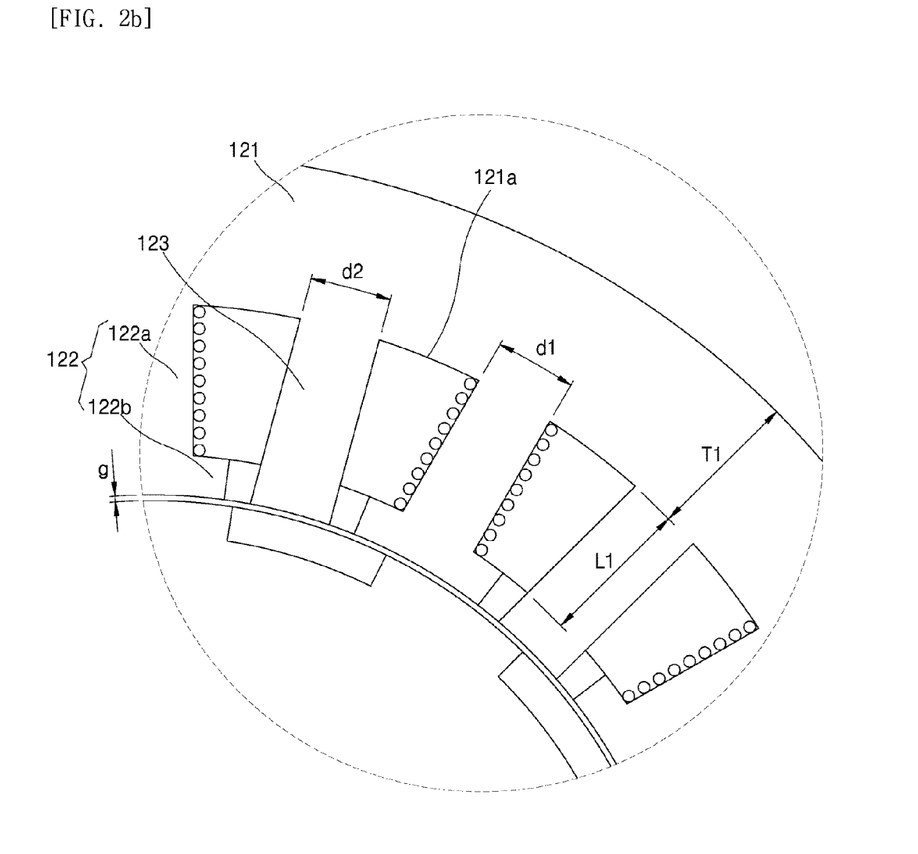
Figure 3A:
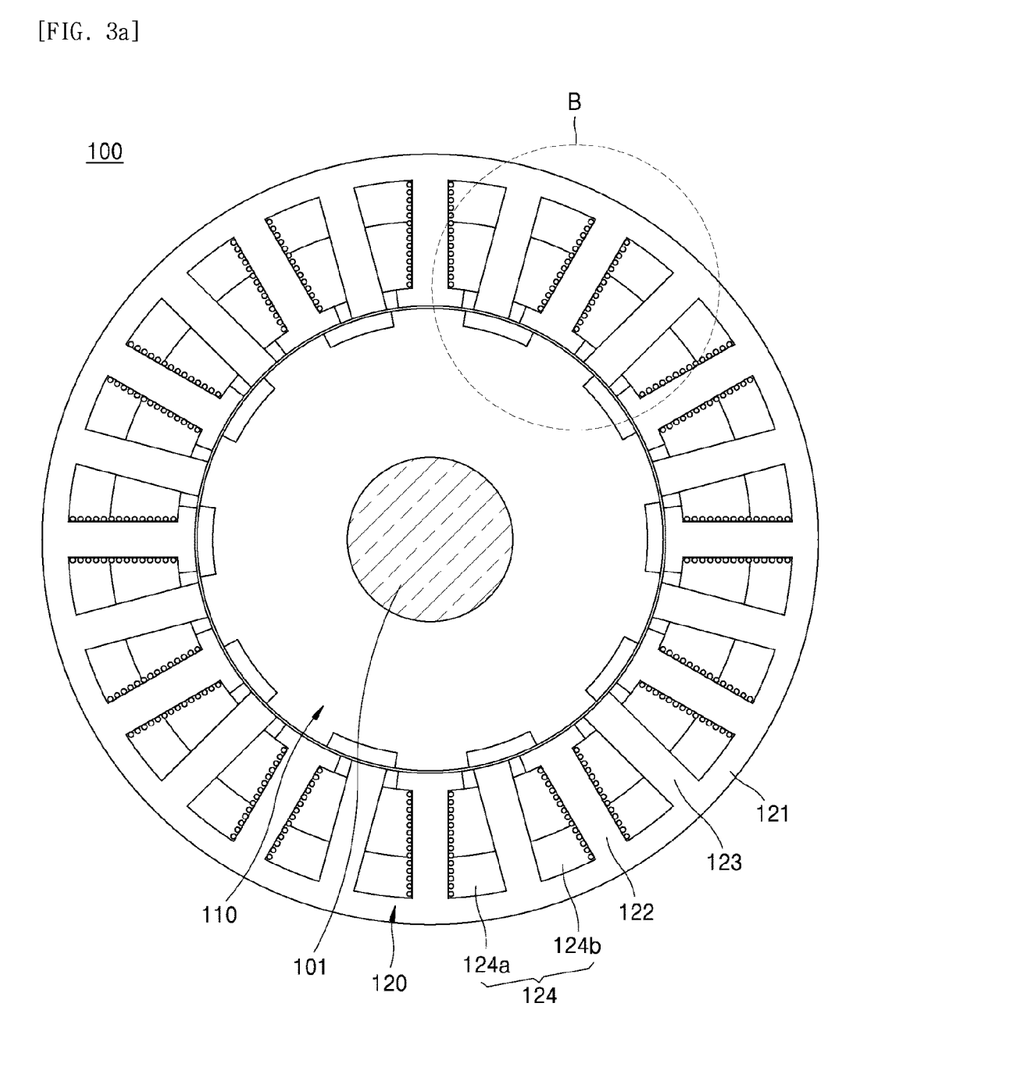
FIG. 3a is a plane view illustrating the other surface of the motor assembly of FIG. 1.
Figure 3B:
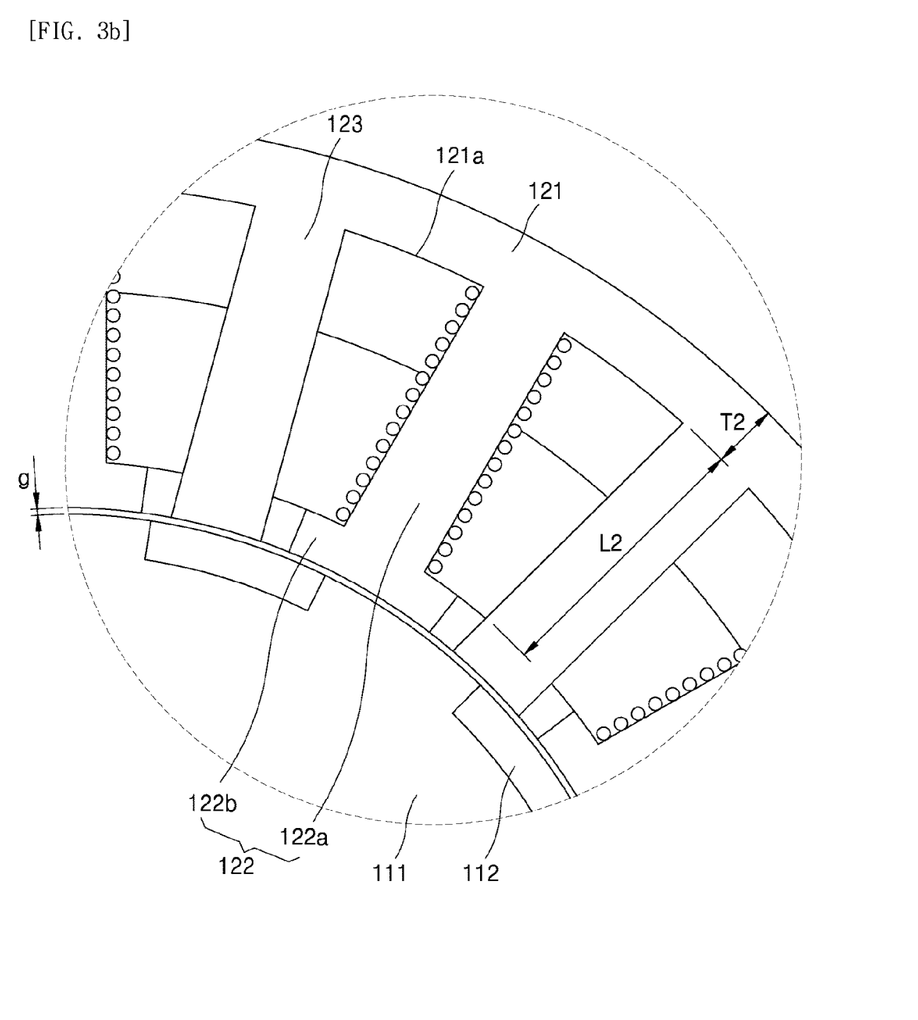

FIG. 1 is a perspective view of a motor assembly 100 according to one embodiment of the present invention. FIG. 2a is a plane view illustrating one surface of the motor assembly 100 of FIG. 1, and FIG. 2b is an expanded view of region A marked in FIG. 2a. FIG. 3a is a plane view illustrating the other surface of the motor assembly 100 of FIG. 1, and FIG. 3b is an expanded view of region B marked in FIG. 3a.

Referring to FIGS. 1 to 3a, the motor assembly 100 may include a rotation shaft 101, a rotor 110, and a stator 120. In the motor assembly 100, the rotor 110 may be rotated with respect to the stator 120 by a magnetic flux generated between the rotor 110 and the stator 120.

The motor assembly 100 may be embodied in various ways depending on the arrangement of permanent magnets mounted in the rotor 110. For example, the motor assembly 100 may be a surface permanent magnet (SPM) motor in which permanent magnets are disposed on the surface of the rotor, or may be an interior permanent magnet (IPM) motor in which permanent magnets are embedded in the rotor. In addition, the motor assembly 100 may be a rotor half-type PM motor in which permanent magnets of the same polarity are disposed only on a part of the surface of the rotor. Hereinafter, for convenience of explanation, description will be made mainly about the rotor half-type PM vernier motor in which permanent magnets are disposed only in part of the rotor 110.

The rotation shaft 101 may be disposed at the center of the rotor 110, to form a rotation axis of the motor assembly 100. The rotation shaft 101 may be connected to an external apparatus (not illustrated), and may transfer driving force generated by rotation of the rotor 110 to the external apparatus.

The rotor 110 may be disposed to surround the rotation shaft 101, and may include a rotor core 111 and a permanent magnet 112. The rotor core 111 may have an approximately cylindrical shape having a predetermined length along a direction of the rotation axis. The permanent magnet 112 may be provided as a plurality of permanent magnets 112. The plurality of permanent magnets 112 may be disposed on a surface of the rotor core 111 and embedded in the rotor core 111, or disposed on the surface of the rotor core 111 only.

As illustrated in the drawings, the number of the permanent magnets 112 of the rotor half-type PM motor may be smaller than the number of coil-wound teeth, salient teeth, or openings. As another example, the number of permanent magnets in the SPM motor may be double the number of the permanent magnets in the rotor half-type PM motor. Here, the number of permanent magnets in the SPM motor may be greater than the number of coil-wound teeth or salient teeth, and may be smaller than the total number of the coil-wound teeth and salient teeth. In the SPM motor, the number of permanent magnets may be greater than the number of openings, and may be smaller than the total number of first openings and second openings. Conventional rotor half-type PM motors and conventional SPM motors do not include salient teeth, whereas the motor assembly 100 of the present invention may include salient teeth 123 so as to expand the passage through which the magnetic flux generated by the permanent magnets 112 flows.

The stator 120 may be disposed outside rotation shaft 101, and the rotor 110 may rotate with respect to the stator 120. The stator 120 may include a stator core 121, coil-wound teeth 122, salient teeth 123, and openings 124.

The stator core 121 may form a main body of the stator 120, and may be disposed outside the rotor core 111. The stator core 121 may have a circular opening in the center thereof, and thus may have an annular shape. The stator core 121 may include an inner surface 121a which is inclined with respect to the rotation axis of the rotor 110. That is, the inner surface 121a of the stator core 121, which forms the openings of the stator core 121, may extend so as to be inclined at a predetermined angle (θ) with respect to a longitudinal direction.

As the inner surface 121a of the stator core 121 is inclined, a first thickness (T1) of the stator core 121 along a radial direction measured on one surface of the stator 120 and a second thickness (T2) of the stator core 121 along the radial direction measured on the other surface of the stator 120 may be different from each other. In addition, a first length (L1) of the openings 124 along the radial direction measured on one surface of the stator 120 and a second length (L2) of the openings 124 along the radial direction measured on the other surface of the stator 120 may be different from each other. These are illustrated in FIGS. 2a and 3a.

Figure 4:
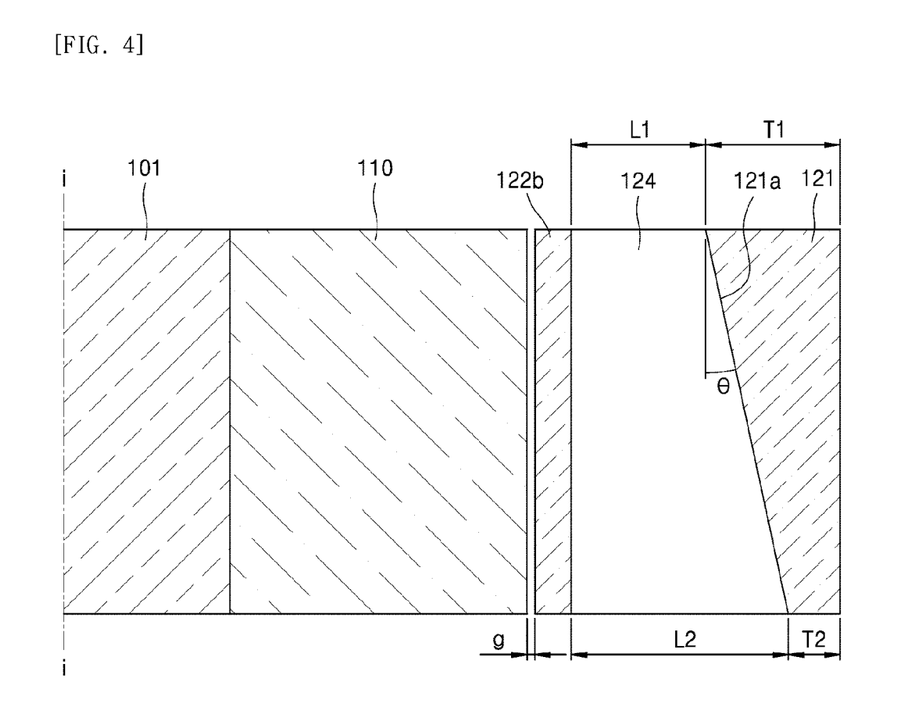
FIG. 4 is a cross-sectional view of the motor assembly of FIG. 1.

The inner surface 121a of the stator core 121 may be inclined with respect to the rotation axis at a predetermined angle (θ). Referring to FIG. 4, the angle (θ) may be formed to be constant along the direction of the rotation axis, and thus the thickness of the stator core 121 along the radial direction may linearly increase along one direction of the rotation axis.

The inner surface 121a of the stator core 121 may be inclined with respect to the rotation axis at an angle greater than 0 degrees and smaller than 20 degrees. When the angle (θ) is 0 degrees, an effect of amplifying the magnetic flux may not be achieved, and when the angle (θ) is the same as or greater than 20 degrees, a torque generated by the motor assembly 100 may be reduced. This will be described in more detail below.

The coil-wound teeth 122 may extend from the inner surface 121a of the stator core 121 towards the rotation axis. A coil (C) may be wound around the coil-wound teeth 122, and a plurality of coil-wound teeth 122 may be disposed in the stator core 121 along a circumferential direction. Each of the coil-wound teeth 122 may include a coil-wound rib 122a around which the coil (C) is wound, and a protrusion 122b protruding from an end portion of the coil-wound rib 122a in the circumferential direction. The protrusion 122b may induce an inflow of magnetic flux and may enable the coil (C) to be wound at a certain position.

The coil (C) may be wound in various manners. For example, the coil (C) may be wound around the coil-wound teeth 122 from an upper surface towards a lower surface of the coil-wound teeth 122, or from the lower surface towards the upper surface. In addition, the coil (C) may be wound around the coil-wound teeth 122 in the radial direction of the stator core 121, or in a direction opposite to the radial direction.

Since the coil-wound teeth 122 extend from the inclined inner surface 121a of the stator core 121, a length of the coil-wound teeth 122 along the radial direction may change along one direction of the rotation axis. A thickness d1 of the coil-wound teeth 122 along the circumferential direction may be constant.

The salient teeth 123 may be disposed between every two adjacent coil-wound teeth 122. The salient teeth 123 may be disposed to cross the openings 124, and thus the salient teeth 123 may divide the spaces between the coil-wound teeth 122. The salient teeth 123 may extend from the inner surface 121a of the stator core 121 towards the rotation axis, but the coil (C) is not wound around the salient teeth 123. A thickness d2 of the salient teeth 123 along the circumferential direction may be constant.

The coil (C) may be wound around the coil-wound teeth 122 such that the coil-wound teeth 122 have a function of generating a magnetic flux, whereas the coil (C) may not be wound around the salient teeth 123, and thus the salient teeth 123 may serve as a passage through which the generated magnetic flux passes. In addition, while the coil-wound teeth 122 may include the protrusion 122b protruding from the end portion of the coil-wound teeth 122 in the circumferential direction, the salient teeth 123 may not have an element corresponding to the protrusion 122b.

A length of the salient teeth 123 in the radial direction may be the same as a length of the coil-wound teeth 122 in the radial direction. That is, the salient teeth 123 and the coil-wound teeth 122 may have the same length as each other in the radial direction. Therefore, when end portions of the salient teeth 123 and end portions of the coil-wound teeth 122 are connected to each other, a virtual circle with a constant radius may be formed about the rotation axis. In addition, an air gap of a first distance (g) may be formed between the end portions of the coil-wound teeth 122 and the rotor 110 and between the end portions the salient teeth 123 and the rotor 110.

Furthermore, the thickness d1 of the coil-wound teeth 122 along the circumferential direction and the thickness d2 of the salient teeth 123 along the circumferential direction may be the same as each other. If the thickness d1 of the coil-wound teeth 122 along the circumferential direction and the thickness d2 of the salient teeth 123 along the circumferential direction are different from each other, the magnetic flux generated in the coil-wound teeth 122 may not smoothly flow to the salient teeth 123. If the thickness d2 of the salient teeth 123 is smaller than the thickness d1 of the coil-wound teeth 122, the magnetic flux generated in the coil-wound teeth 122 and the rotor 110 may not smoothly flow to the stator 120 due to the relatively narrow passage of the salient teeth 123. If the thickness d2 of the salient teeth 123 is greater than the thickness d1 of the coil-wound teeth 122, a cross-sectional area of the openings 124 may be relatively small, and thus a sufficient amount of magnetic flux may not be generated. As a result, the magnetic flux may not be concentrated, and thus there may be a limit in generating a relatively high torque. In the motor assembly 100 of the present invention, however, the thickness d1 of the coil-wound teeth 122 along the circumferential direction and the thickness d2 of the salient teeth 123 along the circumferential direction may be the same as each other. Accordingly, a sufficient amount of magnetic flux generated in the coil-wound teeth 122 may flow to the salient teeth 123, and as the magnetic flux is concentrated, a relatively high torque may be generated.

The end portions of the coil-wound teeth 122 and the end portions of the salient teeth 123 may be spaced apart from each other by a predetermined distance. The end portions of the coil-wound teeth 122 and the end portions of the salient teeth 123 may be spaced apart from each other by a distance of d3, and thus the coil-wound teeth 122 and the salient teeth 123 may not be structurally connected to each other. This structure may enable the magnetic flux to flow separately to each of the coil-wound teeth 122 and the salient teeth 123.

The openings 124 may be spaces formed by sidewalls of the coil-wound teeth 122 and the inner surface 121a of the stator core 121. Since the inner surface 121a of the stator core 121 is inclined with respect to the rotation axis, a cross-sectional area of the openings 124 may change along a direction of the rotation axis. When comparing FIG. 2a and FIG. 3a, it may be understood that a surface area of the openings 124 measured at one surface of the stator 120 and a surface area of the openings 124 measured at the other surface of the stator 120 are different from each other. The openings 124 may have a first length L1 along the radial direction at one surface of the stator 120, whereas the openings 124 may have a second length L2, which is greater than the first length L1, along the radial direction at the other surface of the stator 120. That is, a distance between an inside and an outside of the stator 120 may be constant, whereas the thickness of the stator core 121 may change along one direction of the rotation axis. Accordingly, the surface area of the openings 124 may also change along one direction of the rotation axis.

When the inner surface 121a of the stator core 121 is inclined with respect to the rotation axis at a constant angle ($\theta$), the surface area of the openings 124 may linearly change along one direction of the rotation axis. That is, as a cross-sectional area of the stator core 121 changes along one direction of the rotation axis, the cross-sectional area of the openings 124 may also change. Accordingly, the cross-sectional area of the openings 124 may change along one direction of the rotation axis.

Each of the openings 124 may include a first opening 124a and a second opening 124b, which are divided by the salient teeth 123. The first opening 124a and the second opening 124b may be symmetrical to each other with respect to the salient teeth 123, and may have substantially the same function.

FIG. 4 is a cross-sectional view of the motor assembly 100 of FIG. 1.

Referring to FIG. 4, the inner surface 121a of the stator core 121 may be formed to be inclined with respect to the rotation axis at a predetermined angle ($\theta$). Due to the inclination, a cross-sectional area of the inner space forming the openings 124 changes along one direction of the rotation axis. As a result, the volume of the openings 124 may increase as much as a reduced volume of the stator core 121.

In the stator 120 according to the present invention, the inner surface 121a of the stator core 121 may have an inclination angle ($\theta$), and thus the volume of the openings 124 may be reduced. As the surface area of the openings 124 changes along one direction of the rotation axis, a portion for forming the magnetic flux and a space through which the magnetic flux flows may be effectively formed, and thus a relatively high energy density per volume may be formed. Consequently, the current density may be improved, and thus the motor assembly 100 may generate a relatively high torque. In addition, as the openings 124 are formed in such a manner that the volume of the openings 124 is minimized, the space of the motor assembly 100 may be more efficiently used, and the size of the motor assembly 100 may be reduced.

Figures 5A, 5B:
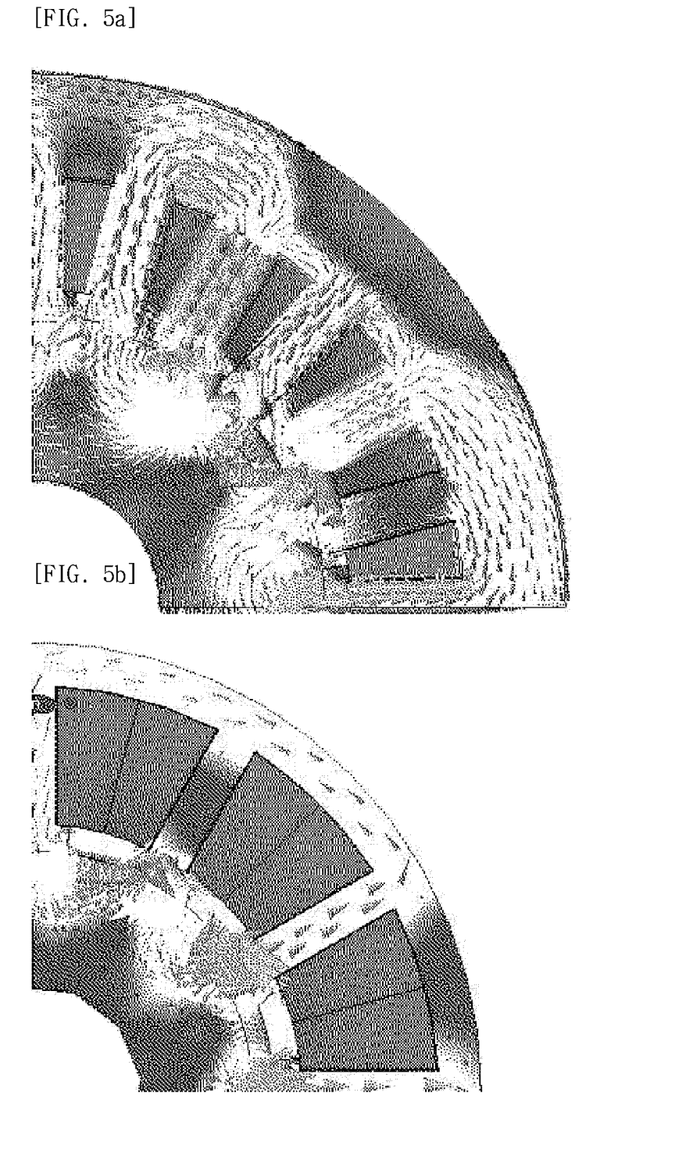
Figure 5C:
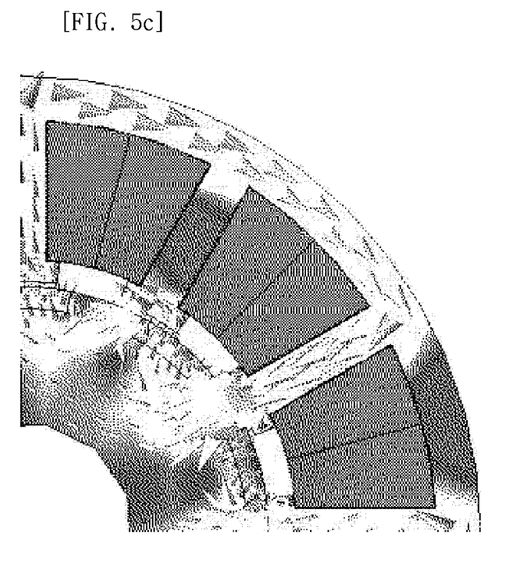

FIG. 5a is a view illustrating the flow of magnetic flux in the motor assembly 100 of FIG. 1, and FIGS. 5b and 5c are views illustrating, as comparative examples, the flow of magnetic flux in conventional motors.

FIG. 5a illustrates a rotor half-type PM motor assembly including the rotor 110 and the stator 120, wherein the stator 120 includes the salient teeth 123, the cross-sectional area of the openings 124 changes along one direction of the rotation axis, and the permanent magnets 112 are disposed on the surface of the rotor 110 to be spaced apart from each other at regular intervals. As illustrated in FIG. 5a, a relatively strong magnetic flux flows along the coil-wound teeth 122. At the same time, the generated magnetic flux may flow along the salient teeth 123, and thus a relatively strong magnetic field may be formed. That is, the rotor half-type PM motor assembly may have improved current density and energy density, and thus a relatively high torque may be generated.

FIG. 5b illustrates a conventional SPM motor. As illustrated, a flow of magnetic flux is generated along the teeth around which a coil has been wound, but the flow of the magnetic flux is concentrated only between the rotor and the teeth, and the generated magnetic flux does not sufficiently flow to the stator or the rotor. As a result, the current density generated by the motor may be relatively low, and thus there may be a limit in generating a relatively high torque.

FIG. 5c illustrates a conventional double half-type PM motor, in which some permanent magnets are disposed on the surface of the rotor to be spaced apart from each other, and the other permanent magnets are disposed in the stator to be spaced apart from each other. In detail, the permanent magnets may be disposed at an end portion of the teeth of the stator. It may be possible to improve the performance of the double half-type PM motor as compared to the rotor half-type PM motor by also disposing permanent magnets in the stator. However, the permanent magnets may cause a short circuit of the magnetic flux. Specifically, the polarities of electromagnets in the stator may continuously change, whereas the polarity of the permanent magnets may be constant. Therefore, when the rotor rotates, a short circuit of the magnetic flux may be caused by the permanent magnets of the stator. Accordingly, even when the permanent magnets are also disposed in the stator, there may be a limit in generating a relatively high torque.

Referring to FIG. 5c, a stronger flow of magnetic flux may be generated in the double half-type PM motor as compared to the SPM motor, but the stronger flow may be confined to between the teeth and the rotor, and the generated magnetic flux may not sufficiently flow, and may flow just locally.

Table 1 below compares the motor assembly 100 of the present invention in which the inner surface 121a of the stator core 121 is inclined at various angles, with comparative examples including conventional motors and a motor in which the inner surface is inclined at a relatively high angle.

All of the motors of the present invention and the comparative examples are set such that an outer diameter of the stator is 82 mm, a length of the motor assembly is 35 mm, an air gap between the rotor and the stator is 0.5 mm, a diameter of the coil is 0.8 mm, an outer diameter of the motor is 42 mm, a thickness of the permanent magnet is 2 mm, and the permanent magnet has a grade of 50JN400.

Comparative example 1 is an SPM motor having a magnetic flux illustrated in FIG. 5b, and comparative example 2 is a double half-type PM motor having a magnetic flux illustrated in FIG. 5c.

The motor assemblies of the present invention are set such that the inclination angle formed between the inner surface of the stator core and the rotation axis is 5 degrees, 7.5 degrees, 10 degrees, and 15 degrees, respectively, and the salient teeth are also provided. Comparative example 3 is the same motor assembly as that of the present invention in which salient teeth are provided, except that the inclination angle formed between the inner surface of the stator core and the rotation axis is 20 degrees.

TABLE 1

|  | Comparative Example 1: SPM Motor | Comparative Example 2: Double Half-Type PM Motor | Motor Assembly of the Present Invention | | | | Comparative Example 3 |
|---|---|---|---|---|---|---|---|
| Inclination Angle | 0° | 0° | 5° | 7.5° | 10° | 15° | 20° |
| Number of Coil Windings | 150 | 150 | 150 | 150 | 150 | 150 | 150 |
| Torque (N/m) | 2.24 | 3.85 | 4.81 | 4.92 | 4.97 | 5.05 | 2.75 |

Referring to Table 1 above, comparative example 1 (SPM motor) generates a torque of 2.24 N/m, and comparative example 2 (double half-type PM motor) generates a torque of 3.85 N/m. In contrast, the motor assembly of the present invention generates a torque of 4.81 N/m when the inclination angle is 5 degrees, a torque of 4.92 N/m when the inclination angle is 7.5 degrees, a torque of 4.97 N/m when the inclination angle is 10 degrees, and a torque of 5.05 N/m when the inclination angle is 15 degrees, which are higher than the torques of comparative examples 1 and 2. That is, the motor assembly of the present invention has a relatively high current density and a relatively high energy density, to thereby generate a relatively high torque.

However, when the inclination angle is 20 degrees as in comparative example 3, the torque drastically falls to 2.75 N/m. When the inclination angle is the same as or greater than 20 degrees, the volume of the openings 124 may significantly decrease, and thus there may not be enough space to generate a sufficient amount of magnetic flux. As a result, comparative example 3 may have a limit in generating a relatively high torque.

As compared in Table 1 above, the cross-sectional area of the openings 124 of the motor assembly 100 of the present invention may change along one direction of the rotation axis. As a result, current density improves and energy efficiency is increased. Accordingly, the motor assembly 100 of the present invention may generate a higher torque as compared to conventional motors. In addition, since the motor assembly 100 of the present invention includes the salient teeth, which form a passage through which a generated magnetic flux sufficiently flows, a relatively high torque may be generated.

In particular, in the motor assembly 100 of the present invention, the inner surface 121a of the stator core 121 may be inclined at an angle greater than 0 degrees and smaller than 20 degrees, which may maximize the energy density and the current density. Accordingly, a relatively high torque may be generated.

While the present invention has been described above in relation to its embodiments illustrated in the drawings, it is to be understood by those skilled in the art that the description is merely exemplary, and various modifications and other equivalent embodiments are possible therefrom. Accordingly, the true technical scope of the present invention should be determined by the technical spirit of the appended claims.

INDUSTRIAL APPLICABILITY

According to an embodiment of the present invention, a stator for use in general industrial fields and a motor assembly including the same are provided.

The invention claimed is:

1. A stator comprising:
a stator core disposed outside a rotor having a rotation axis, wherein the stator core has an inner surface surrounding the rotor around the rotation axis;
a plurality of coil-wound teeth extending from the inner surface of the stator core towards the rotation axis, wherein a coil is wound around each of the plurality of coil-wound teeth; and
openings formed by sidewalls of the plurality of coil-wound teeth and the inner surface of the stator core and having a cross-sectional area perpendicular to the rotation axis,
wherein the inner surface of the stator core is inclined with respect to the rotation axis, thus the cross-sectional area of the openings changes along a direction of the rotation axis, a thickness of the stator core in a radial direction linearly increases along the direction of the rotation axis, and a distance from the rotation axis to the inner surface of the stator core in the radial direction linearly decreases along the direction of the rotation axis.

2. The stator of claim 1, wherein the cross-sectional area of the openings measured at a top surface of the stator and the cross-sectional area of the openings measured at a bottom surface of the stator are different from each other.

3. The stator of claim 1, further comprising a plurality of salient teeth around which a coil is not wound, wherein the plurality of salient teeth extend from the inner surface of the stator core towards the rotation axis across the openings.

4. The stator of claim 3, wherein a length of the salient teeth in a radial direction is the same as a length of the coil-wound teeth in the radial direction.

5. The stator of claim 3, wherein a thickness of the salient teeth in a circumferential direction is the same as a thickness of the coil-wound teeth in the circumferential direction.

6. The stator of claim 3, wherein an end portion of the salient teeth and an end portion of the coil-wound teeth are spaced apart from each other by a predetermined distance along a circumferential direction.

7. The stator of claim 1, wherein the inner surface of the stator core is inclined with respect to the rotation axis at an angle greater than 0 degrees and smaller than 20 degrees.

8. A motor assembly comprising:
a rotor core configured to rotate about a rotation axis;
a plurality of permanent magnets disposed on a surface of the rotor core or at least partially embedded in the rotor core;
a stator core disposed outside the rotor core and having an inner surface surrounding the rotor core around the rotation axis;
a plurality of coil-wound teeth extending from the inner surface of the stator core towards the rotation axis;
a coil wound around the coil-wound teeth; and
openings formed by sidewalls of the plurality of coil-wound teeth and the inner surface of the stator core and having a cross-sectional area perpendicular to the rotation axis,
wherein the inner surface of the stator core is inclined with respect to the rotation axis, thus the cross-sectional area of the openings changes along a direction of the rotation axis, a thickness of the stator core in a radial direction linearly increases along the direction of the rotation axis, and a distance from the rotation axis to the inner surface of the stator core in the radial direction linearly decreases along the direction of the rotation axis.

9. The motor assembly of claim 8, wherein the inner surface of the stator core is inclined with respect to the rotation axis at an angle greater than 0 degrees and smaller than 20 degrees.

10. The motor assembly of claim 8, further comprising a plurality of salient teeth around which a coil is not wound, wherein the plurality of salient teeth extend from the inner surface of the stator core towards the rotation axis across the openings.

* * * * *